United States Patent [19]

Murata

[11] 4,001,581
[45] Jan. 4, 1977

[54] DEVICE FOR DETECTING A MOVING OBJECT

[75] Inventor: Shinji Murata, Tokyo, Japan

[73] Assignee: Canon Kabushiki Kaisha, Tokyo, Japan

[22] Filed: Mar. 10, 1976

[21] Appl. No.: 665,400

Related U.S. Application Data

[63] Continuation of Ser. No. 493,854, Aug. 1, 1974, abandoned, which is a continuation of Ser. No. 351,999, April 17, 1973, abandoned.

[30] Foreign Application Priority Data

Apr. 28, 1972 Japan .............................. 47-50931

[52] U.S. Cl. .......................... 250/239; 250/222 R; 250/561
[51] Int. Cl.² ......................................... H01J 5/02
[58] Field of Search .......... 250/221, 222, 223, 227, 250/216, 569, 571, 555, 557, 239, 560, 561; 356/237; 235/61.11 E

[56] References Cited

UNITED STATES PATENTS

| | | | |
|---|---|---|---|
| 2,324,304 | 7/1943 | Katzman | 250/227 |
| 2,753,464 | 7/1956 | Stone | 250/239 |
| 3,041,462 | 6/1962 | Ogle | 250/561 |
| 3,489,910 | 1/1970 | Bohme | 250/571 |

*Primary Examiner*—David C. Nelms
*Attorney, Agent, or Firm*—Fitzpatrick, Cella, Harper & Scinto

[57] ABSTRACT

A device for detecting the presence of a moving object, especially in a rotary camera, copier or printer, comprises transport rolls for the object. A pair of reflector members are disposed in opposed relationship so as to define an object transport passage therebetween. The opposed surfaces of the reflector members provide light reflecting surfaces. A light source and a non-transparent member are disposed at or adjacent one end of the reflector members for emitting light into the gap between the reflector members, and a light receiving element is disposed at or adjacent the other end of the reflector members for receiving a light beam passed thereto under repetitive reflections between the reflector members. The non-transparent member prevents the light from the light source from directly reaching the light receiving element. The light reflected between the reflector members may be intercepted by an object transported therebetween, thus detecting the presence of the moving object.

19 Claims, 13 Drawing Figures

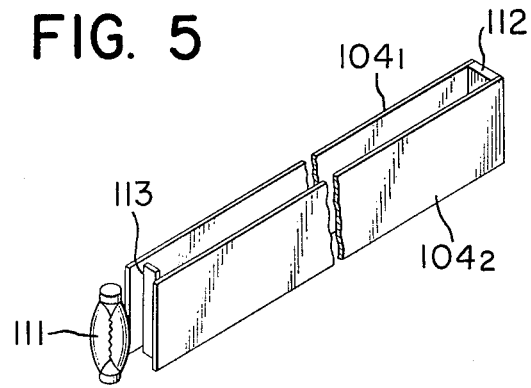
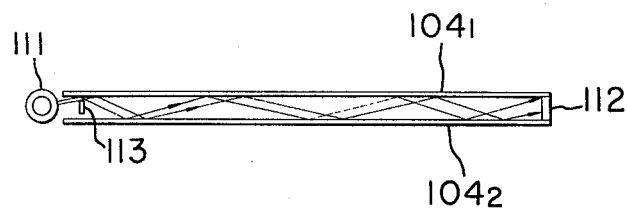
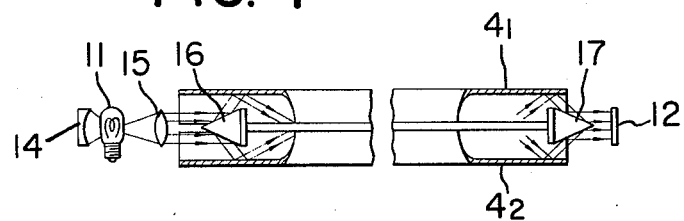
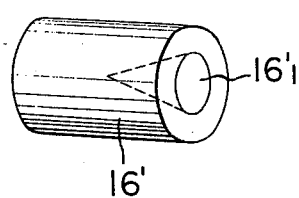
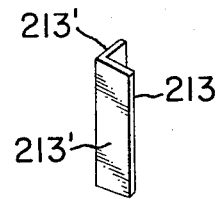

DEVICE FOR DETECTING A MOVING OBJECT

This is a continuation, of application Ser. No. 493,854 filed Aug. 1, 1974 now abandoned which, in turn, is a continuation of application Ser. No. 351,999 filed Apr. 17, 1973.

BACKGROUND OF THE INVENTION

1. Field of the Invention

This invention relates to a device for detecting a moving object, and more particularly to a device for detecting the presence of a sheet-like object such as a sheet of original or copy paper transported along a transport passage in a rotary camera, copier or printer.

2. Description of the Prior Art

In a detector device of the described type heretofore known, a light source and light receiving element are disposed in opposed relationship with a transport passage intervening therebetween and a moving object intercepts the optical path between the light source and the light receiving element to thereby enable the presence of such object to be detected.

However, since the sheet-like object is variable in width, it may happen that the object is transported outside the optical path to thereby prevent itself from being detected. In some cases, the sheet-like object may be transported with its leading edge disposed obliquely with respect to the direction of transport, thereby causing a time delay in the detection, and this is undesirable in that part of the object fails to be photographed or recorded if the object is to be photographed or copied simultaneously with the detection.

In order to avoid such disadvantages, it has heretofore been practised to provide a plurality of light sources and a corresponding number of light receiving elements in the transport passage for the object to thereby form a number of detecting optical paths, but this has involved the use of numerous elements or means which in turn has resulted in an enlarged size and increased cost of the entire device.

SUMMARY OF THE INVENTION

It is an object of the present invention to overcome all the above-noted disadvantages.

It is another object of the present invention to provide a detector device which can simply detect a moving object and which is less expensive than any known to applicant.

It is still another object of the present invention to provide a detector device which is capable of detecting a moving object reliably and quickly.

It is yet another object of the present invention to provide a detector device in which the detecting optical path is readily adjustable and which provides a wider range of detection.

Other objects and features of the present invention will become fully apparent from the following detailed description taken in conjunction with the accompanying drawings.

BRIEF DESCRIPTION OF THE DRAWINGS

FIG. 5 is a perspective view showing an embodiment of the device according to the present invention which employs planar reflector members.

FIG. 6 is a plan view corresponding to FIG. 5.

FIG. 7 is a partly cut-away plan view showing a further embodiment of the present invention which employs a non-transparent member in the form of conical mirror.

FIG. 8 is a perspective view showing another form of the non-transparent member.

FIG. 9 is a perspective view showing still another form of the non-transparent member.

DESCRIPTION OF THE PREFERRED EMBODIMENTS

Figure 1:
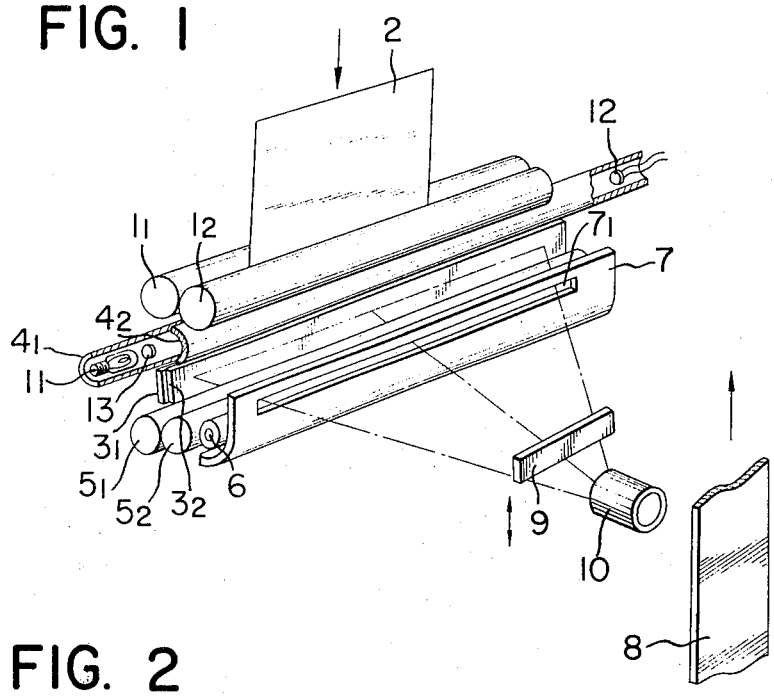
FIG. 1 is a schematic, partly cut-away, perspective view of a rotary camera provided with the device according to the present invention.

Referring to FIG. 1, there is shown a rotary camera provided with the device according to the present invention. It should be understood that the various elements shown there are all accommodated within the camera body. Numerals $1_1$ and $1_2$ designate a set of supply rolls for holding therebetween and transporting a sheet-like object 2 to be photographed such as document, drawing sheet, bank check, card or the like. The supply rolls may be driven from an unshown motor. Transparent glass sheets $3_1$ and $3_2$ forming an exposure station extend parallel to each other so as to permit passage of the object 2 therebetween. A pair of reflector members $4_1$ and $4_2$, which form a detector device to be described, are disposed in opposed relationship so as to define the passage for the object therebetween. A set of discharge rolls $5_1$ and $5_2$ is provided to discharge therethrough the object 2 after exposed to light at the exposure station. An illuminating light source 6 is provided to illuminate the object as it passes through the exposure station, and a douser 7 formed with a slit $7_1$ is disposed behind the light source 6. Numeral 8 denotes a length of microfilm moved by unshown rolls in the direction opposite to that of the movement of the object 2 but at the same speed as that of the latter. A shutter 9 and an image forming lens 10 are disposed between the object 2 and the microfilm 8. A spot light source 11 is disposed within the confinement between the reflector members $4_1$, $4_2$ at one end thereof, and a light receiving element 12 is disposed within the confinement between the reflector members at the other end thereof.

The object 2 is transported into the exposure station by the rolls $1_1$ and $1_2$ and passed between the reflector members $4_1$ and $4_2$ to thereby intercept the reflected light between these reflector members, so that the quantity of light received by the light receiving element 12 is varied. Such variation in the quantity of light received by the element 12 is utilized to detect the presence of the object.

In response to a detection signal from the light receiving element 12, the microfilm 8 starts to move in the direction of the arrow while the shutter is opened, so that the image on the object 2 exposed to the light from the source 6 while passing between the parallel glass sheets $3_1$ and $3_2$ is photographically recorded on the film 8 through the agency of the image forming lens 10. The photographic control mechanism utilizing the detection signal from the light receiving element is well-known in the art and need not be described herein.

Figure 2:
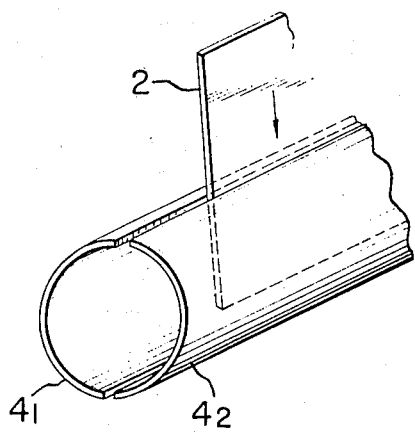
FIG. 2 is a fragmentary perspective view showing one of reflector members employed in FIG. 1.
Figure 4:
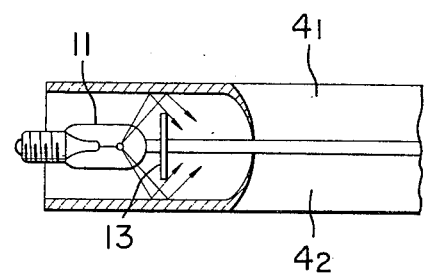
FIG. 4 is an enlarged, fragmentary plan view corresponding to FIG. 3.
Figure 3:
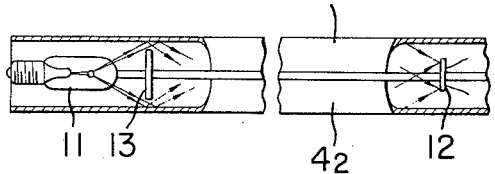
FIG. 3 is a partly cut-away plan view of the inventive device employing such reflector members.

The reflector members $4_1$ and $4_2$ are enlargedly shown in FIG. 2. As seen there, the pair of reflector members are disposed parallel to each other so as to define the passage of the object therebetween. Their opposed surfaces provide reflecting surfaces of light reflecting characteristic, each having a semi-circular cross-section concave with respect to each other, so that the two reflector members together form a hollow cylinder. The spot light source 11 is interposed between the reflector members $4_1$ and $4_2$ at one end thereof, and the non-transparent member 13, which may be in the form of a disc, is disposed just in front of the spot light source 11 and equidistantly spaced apart from the opposed reflecting surfaces of the reflector members $4_1$ and $4_2$. The non-transparent member 13 is intended to prevent the light from the source 11 from being directly thrown upon the light receiving element 12 located at the other end portion of the reflector members $4_1$, $4_2$. Alternatively, the non-transparent member 13 may be located just in front of the light receiving element 12, and may take any suitable shape in accordance with the configuration of the reflector members and the size of the spot light source. Those of the light rays emitted from the light source 11 which tend to directly travel to the light receiving element 12 may be intercepted by the non-transparent member 13, and the light rays stopped down between the non-transparent member 13 and the reflector members $4_1$, $4_2$ are repetitively reflected between the reflecting surfaces of the reflector members until they reach the light receiving element. The location of the light receiving element 12 may be simply determined on an optical axis of the most condensed reflected light by rectilinearly moving the element to the right or to the left as viewed in FIG. 4.

In the above-described device, when the object 2 is moved between the reflector members $4_1$ and $4_2$, it intercepts the reflected light paths between the reflector members $4_1$ and $4_2$ to thereby vary the quantity of light reaching the light receiving element 12, thus enabling the detection of the presence of the object. In the embodiment described above, the reflector members in the form of concave mirrors having a semi-circular cross-section are useful and effective to condense the reflected light at their focus and cause such condensed light to be received by the light receiving element.

FIG. 7 shows a further embodiment of the present invention which employs reflector members similar to those described above. This embodiment includes a mirror 14 disposed behind the spot light source 11, a lens 15 disposed in front of the light source 11 for providing parallel light rays, and a douser member 16 interposed between the reflector members $4_1$ and $4_2$ at one end thereof and having a conical reflecting surface which reflects the parallel light rays at an equal angle toward the reflecting surfaces of the reflector members $4_1$ and $4_2$. A second non-transparent member 17 having a conical reflecting surface similar to that of the non-transparent member 16 is disposed between the reflector members $4_1$ and $4_2$ at the other end portion thereof so that the light repetitively reflected between the pair of reflector members $4_1$ and $4_2$ can be formed into parallel rays which travel toward the light receiving element 12. Thus, the light beam to reach the light receiving element 12 can be more condensed than in the previous embodiment, thereby providing a greater variation in the quantity of light for the detection and accordingly ensuring a higher accuracy of the object detection.

The second non-transparent member 17 disposed in front of the light receiving element 12 may be eliminated if desired. Also, the light receiving element 12 may be disposed fully within the confinement between the reflector members $4_1$ and $4_2$.

Instead of the conical non-transparent member 16, it is possible to employ a glass cylinder $16'$ having a conical concavity $16_1'$ formed at one end portion thereof, as shown in FIG. 8. Such glass cylinder $16'$ may be of such a size as to be snugly inserted between the reflector members $4_1$ and $4_2$ and of such a configuration that the parallel light rays are totally reflected at the concavity. This embodiment enables the non-transparent member to be simply held and facilitates the manufacture of the entire device.

Further, it will be apparent that a reflective metal may be deposited on the surface of the concavity in the glass cylinder so as to provide a reflecting surface.

FIGS. 5 and 6 show a further embodiment of the detector device according to the present invention. In this embodiment, a pair of flat reflector members $104_1$ and $104_2$ are disposed in parallel and opposed relationship to define a transport passage for the object. Their opposed surfaces are planar reflecting surfaces. A linear light source 111 is disposed adjacent one end of the reflector members $104_1$, $104_2$, and a flat, rectangular non-transparent member 113 is disposed between the two reflector members $104_1$ and $104_2$ and equidistantly spaced apart from the reflecting surfaces of the reflector members. A light receiving element 112 is disposed within the confinement between the reflector members $104_1$ and $104_2$ at the other end thereof so as to receive the light beam which passes thereto after repetitive reflection between the reflector members.

These reflector members in the form of plane mirrors are readily obtainable.

In order to condense the reflected light, a lens and a mirror similar to those shown in the FIG. 7 embodiment may be disposed before and behind the light source 111 so as to provide parallel light rays, and a non-transparent member 213 may be provided with a V-shaped reflecting surface $213'$ (see FIG. 9), which surface may reflect the parallel rays at an equal angle toward the reflecting surfaces of the reflector members $104_1$ and $104_2$.

Figure 10:
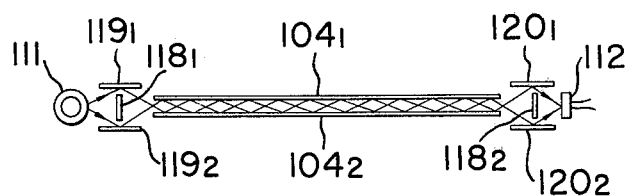
FIG. 10 is a plan view of an embodiment which employs auxiliary reflector members.

FIG. 10 illustrates still a further embodiment of the present invention in which the reflector members $104_1$ and $104_2$ are opposed but more closely spaced apart from each other with the light source 111 and the light receiving element 112 being located outwardly of the opposite ends of the two reflector members $104_1$-$104_2$. As shown there, douser members $118_1$ and $118_2$ are disposed adjacent the opposite ends of the reflector members $104_1$-$104_2$, and second two pairs of opposed reflector members $119_1$, $119_2$ and $120_1$, $120_2$, which are more widely spaced apart than the reflector members $104_1$ and $104_2$, are disposed with the non-transparent members $118_1$ and $118_2$ interposed therebetween, respectively. Those of the light rays emitted from the light source 111 which are reflected by one of the second two pairs of reflector members $119_1$ and $119_2$ are caused to enter the gap between the reflector members $104_1$ and $104_2$, which repetitively reflect the light rays to pass them to the light receiving element 112 through the other pair of second reflector members $120_1$ and $120_2$.

The second reflector members $120_1$ and $120_2$ and the non-transparent member $118_2$ which are disposed in front of the light receiving element 112 may be omitted so that the light repetitively reflected between the reflector members $104_1$ and $104_2$ may be directly received by the element 112.

The present embodiment is suitable for the detection of the presence of a thin sheet-like object and permits the provision of a compact device.

The reflector members may also have a circular cross-section to provide the same effect as that described above.

Figure 11:
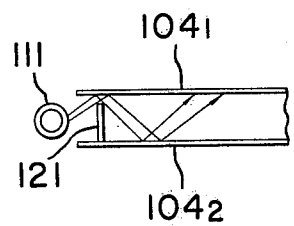
FIG. 11 is a fragmentary plan view showing an embodiment in which the non-transparent member is secured to one reflector member.

FIG. 11 illustrates still a further embodiment of the present invention. While the embodiments described hitherto have employed non-transparent members each spaced apart equidistantly from the reflecting surfaces of the reflector members, the embodiment of FIG. 11 shows a non-transparent member 121 secured to one of the reflector members $104_2$ but spaced apart from the other reflector member $104_1$. This embodiment is advantageous in that it permits the device to be manufactured more easily than those embodiments in which the non-transparent members are disposed between and spaced apart from the two reflector members.

Figure 12:
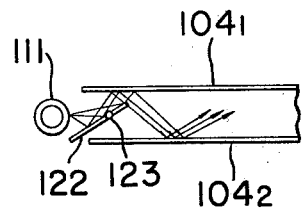
FIG. 12 is a fragmentary plan view of an embodiment which employs a pivotable non-transparent member.

Referring to FIG. 12, there is shown a further embodiment in which the non-transparent member is pivotally mounted between the two reflector members. As shown, the non-transparent member, designated here by numeral 122, is pivotally supported on a pivot 123 and has one surface thereof formed as a reflecting surface for reflecting the light from the source 111 toward the reflecting surface of the reflector member $104_1$.

Pivotal movement of such non-transparent member 122 adjusts the frequency of reflections and further, the light receiving element (not shown in FIG. 12) need not be moved rectilinearly but may remain stationary in order to adjust the optical axis of the reflected light to the light receiving element.

Figure 13:
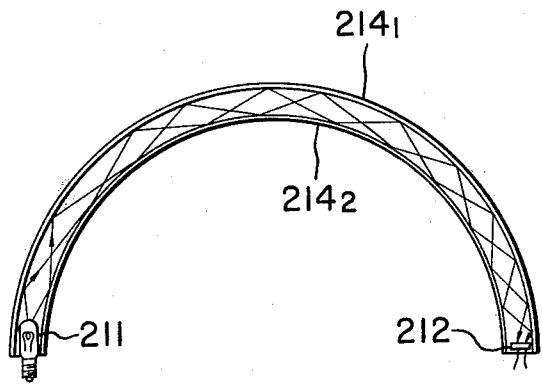
FIG. 13 is a plan view of an embodiment for detecting a curved object.

FIG. 13 shows an embodiment which is suited to the detection of an arcuately curved object to be photographed. For this purpose, two reflector members $214_1$ and $214_2$ are semi-circularly curved along the length thereof and their opposed inner surfaces are formed as reflecting surfaces. At the opposite ends of the semicircle, there is disposed a light source 211 and a light receiving element 212 in the manner as shown. This embodiment eliminates the need to provide any non-transparent member.

According to the present invention, a light source lies at or adjacent one end of the opposed reflector members and a light receiving element is positioned at or adjacent the other end of the reflector members, so that the light from the source travelling to the light receiving element while being reflected between the reflector members may be intercepted by a moving object passing between the reflector members to thereby enable the presence of the object to be detected. Such arrangement eliminates the necessity of providing a plurality of light sources and corresponding light receiving elements as was the case with the prior art, and thus leads to the provision of a simplified and compact construction of the entire device. Furthermore, a wider range and higher accuracy of detection is ensured because the light passing from the light source follows a number of zigzagged paths provided by the repetitive reflections effected between the reflector members before it reaches the light receiving element. In addition, the optical registration between the light source and the light receiving element can be accomplished simply by adjusting the rectilinear distance therebetween and without imposing any limitations in their arrangement. The present invention has a further advantage that it is superior in response characteristic to the conventional detector system which utilizes microswitches or the like responsive to mechanical variations.

Although the invention has been shown and described as being applied to a rotary camera, it will be apparent that it is equally applicable to copiers, printers or the like.

I claim:
1. A device for detecting the presence of a moving object comprising:
   light source means disposed in the vicinity of a side of a transporting path of said object,
   light receiving means disposed at an opposite side of said light source means with respect to said transporting path,
   reflecting means disposed between said light source means and said light receiving means having facing and spaced apart reflecting surfaces to provide a straight-line light path connecting said light source means and said light receiving means, said object being transportable along the transporting path between the reflecting surfaces of said reflecting means, and
   a non-transparent member disposed in said straight-line path for preventing the light of said light source means from directly reaching said light receiving means and permitting only the light repetitively reflected between the reflecting surfaces of said reflecting means to reach said light receiving means.

2. A device according to claim 1, wherein the reflecting surfaces of said reflecting means are curved and they are arranged with their concave surfaces facing each other.

3. A device according to claim 2, wherein the reflecting surfaces of said reflecting means are of a semi-circular shape and arranged to form a cylindrical surface with said reflecting surfaces, and said non-transparent member has a disc-like shape and is disposed between the reflecting surfaces of said reflecting means.

4. A device according to claim 1, wherein the reflecting surfaces of said reflecting means are plane and they are arranged in parallel.

5. A device according to claim 1, wherein said non-transparent member is disposed between the reflecting surfaces of said reflecting means and spaced apart from the reflecting surface of said reflecting means.

6. A device according to claim 5, wherein said non-transparent member is pivotally supported and has a reflecting surface for reflecting the light from said light source toward the reflecting surface of said reflecting means.

7. A device according to claim 1, wherein said light source means includes a light source and second reflecting means for reflecting the light from said light source means toward the reflecting surfaces of said reflecting means, said second reflecting means having reflecting surfaces in parallel with the reflecting surfaces of said reflecting means.

8. A device according to claim 7, wherein the reflecting surfaces of said second reflecting means have the same shape as the reflecting surfaces of said reflecting means.

9. A device according to claim 7, wherein the distance between the reflecting surfaces of said second reflecting means is wider than that between the reflecting surfaces of said reflecting means and said non-transparent member is interposed between the reflecting surfaces of said second reflecting means.

10. A device according to claim 1, wherein said non-transparent member is disposed between the reflecting surfaces of said reflecting means and spaced apart from at least one of the reflecting surfaces of said reflecting means.

11. A device according to claim 1, wherein said light source means includes a light source, optical means for converting the light from said source into parallel light rays, and said non-transparent member having a reflecting surface for reflecting said parallel light rays toward the reflecting surfaces of said reflecting means.

12. A device according to claim 11, wherein said non-transparent member has a conically-shaped reflecting surface.

13. A device according to claim 11, wherein said non-transparent member has a V-shaped reflecting surface.

14. A device according to claim 12, wherein said non-transparent member is in the form of a glass cylinder having a conical recess formed at one end thereof.

15. A device according to claim 7, wherein the reflecting surfaces of said second reflecting means are plane and said non-transparent member is disposed between the reflecting surfaces of said second reflecting means.

16. A device according to claim 7, wherein the reflecting surfaces of said second reflecting means are concave and said non-transparent member is disposed between the reflecting surfaces of said second reflecting means.

17. A device for detecting the presence of a moving sheet comprising:
  means for transporting a sheet along a path,
  light source means disposed on one side of said transporting path of said sheet,
  detecting means disposed on the opposite side of said transporting path of said sheet,
  reflecting means having a pair of opposite and spaced apart reflecting surfaces, said light source means and said detecting means being disposed facing each other across the reflecting surfaces of said reflecting means and said sheet being transportable between said reflecting surfaces, and
  light interrupting means disposed between said light source means and said detecting means for interrupting the light directly headed for said detecting means from said light source means and permitting only the light repetitively reflected between the reflecting surfaces of said reflecting means to reach said light receiving means.

18. A device for detecting the presence of a moving object comprising:
  a pair of guide members spaced apart from each other and having reflecting surfaces on facing surfaces, said guide members defining a guide path of said moving object,
  light source means disposed on one side of said guide path,
  light receiving means disposed on the opposite side of said guide path and facing said light source means across the reflecting surfaces of said pair of guide members, and direction to prevent light from said light source means from directly reaching said detecting means but allowing the light which has been repeatedly reflected between said reflecting surfaces to reach said detecting means.

19. A device for detecting the presence of a moving object comprising:
  first reflecting means at one side of a transporting path of the moving object;
  second reflecting means at the other side of the transporting path of the moving object;
  light source means disposed in the vicinity of one end of said first reflecting means; and
  detecting means disposed in the vicinity of the other end of said first reflecting means;
  said first and second reflecting means having respective reflecting surfaces which are curved in the same
  interrupting means disposed in front of said light source means for interrupting the light from said light source means from directly reaching said light receiving means and permitting only the light repetitively reflected between the reflecting surfaces of said guide members to reach said light receiving means.

* * * * *

UNITED STATES PATENT AND TRADEMARK OFFICE
CERTIFICATE OF CORRECTION

PATENT NO. : 4,001,581
DATED : January 4, 1977
INVENTOR(S) : SHINJI MURATA

It is certified that error appears in the above-identified patent and that said Letters Patent are hereby corrected as shown below:

Column 2, line 16, change "axuiliary" to -- auxiliary --.
    Column 8, lines 27 to 31, delete "direction to prevent
. . . . reach said detecting means.", and insert in lieu thereof
-- interrupting means disposed in front of said light source
    means for interrupting the light from said light source
    means from directly reaching said light receiving means
    and permitting only the light repetitively reflected
    between the reflecting surfaces of said guide members
    to reach said light receiving means. --;
lines 45 to 51, delete "interrupting means disposed . . . .
said light receiving means.", and insert in lieu thereof
-- direction to prevent light from said light source means
from directly reaching said detecting means but allowing the
light which has been repeatedly reflected between said reflecting surfaces to reach said detecting means. --

Signed and Sealed this

Thirty-first Day of May 1977

[SEAL]

Attest:

RUTH C. MASON
*Attesting Officer*

C. MARSHALL DANN
*Commissioner of Patents and Trademarks*